(12) United States Patent
Ichikawa et al.

(10) Patent No.: US 7,272,465 B2
(45) Date of Patent: Sep. 18, 2007

(54) CHEMICAL SUBSTANCE TOTAL MANAGEMENT SYSTEM, STORAGE MEDIUM STORING CHEMICAL SUBSTANCE MANAGEMENT PROGRAM AND CHEMICAL SUBSTANCE TOTAL MANAGEMENT METHOD

(75) Inventors: Yoshiaki Ichikawa, Tokai-mura (JP); Takako Oono, Hitachi (JP); Akira Sekine, Hitachiota (JP); Tetsuya Matsui, Hitachi (JP); Kiyomi Funabashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/230,511

(22) Filed: Sep. 21, 2005

(65) Prior Publication Data

US 2006/0015212 A1    Jan. 19, 2006

Related U.S. Application Data

(60) Continuation of application No. 10/884,983, filed on Jul. 7, 2004, now Pat. No. 6,980,883, which is a division of application No. 09/793,240, filed on Feb. 26, 2001, now Pat. No. 6,778,877.

(30) Foreign Application Priority Data

Feb. 28, 2000    (JP)    ............................... 2000-55960

(51) Int. Cl.
    G06F 7/00    (2006.01)
(52) U.S. Cl. ...................................... 700/213; 700/266

(58) Field of Classification Search ................ 700/213, 700/266; 707/2, 4, 200, 204, 205; 705/7, 705/28

See application file for complete search history.

(56) References Cited

U.S. PATENT DOCUMENTS 4,034,339 A    7/1977    Free et al. ..................... 714/45

(Continued)

FOREIGN PATENT DOCUMENTS

EP    0 964 349    12/1999

(Continued)

OTHER PUBLICATIONS

The Hitachi Hyouron, vol. 81, No. 12, pp. 31-34: Total Solutions and Systemization for Industrial Innovation, sub-title: Ecology Information Systems for Circulatory Society, issued by Hitachi Hyoronsha on Dec. 1, 1999.

(Continued)

*Primary Examiner*—Khoi H. Tran
(74) *Attorney, Agent, or Firm*—Kenyon & Kenyon LLP

(57) ABSTRACT

A chemical substance total management system aids for reduction of release and transferring amount of managing substances in business entities. The system retrieves releasing and transferring amount record relating to predetermined managing substance on the basis of total tabulation link information with correlation between the tabulation result record managing releasing and transferring amount of managing substance per releasing and transferring destination and releasing and transferring amount record to be a source generating tabulation result record.

3 Claims, 12 Drawing Sheets

U.S. PATENT DOCUMENTS

| | | | |
|---|---|---|---|
| 5,311,437 A | 5/1994 | Leal et al. | 364/468 |
| 5,532,928 A | 7/1996 | Stanczyk et al. | 700/213 |
| 5,726,884 A | 3/1998 | Sturgeon et al. | 705/9 |
| 6,097,995 A | 8/2000 | Tipton et al. | 700/266 |
| 6,256,640 B1 | 7/2001 | Smalley et al. | 705/28 |
| 6,778,877 B2 * | 8/2004 | Ichikawa et al. | 700/213 |
| 6,980,883 B2 * | 12/2005 | Ichikawa et al. | 700/213 |
| 7,092,960 B2 * | 8/2006 | Ohishi et al. | 707/103 R |

FOREIGN PATENT DOCUMENTS

| | | |
|---|---|---|
| JP | 08-044759 | 2/1996 |
| JP | 11-161709 | 6/1999 |
| JP | 11-353383 | 12/1999 |
| JP | 2000-137747 | 5/2000 |
| WO | 98/11493 | 3/1998 |

OTHER PUBLICATIONS

The Hitachi Hyouron, vol. 82, No. 1, p. 110: Society/Industrial/Home Industry System, sub-title: Chemical Substance Total Management Supporting System, issued by Hitachi Hyoronsha on Jan. 1, 2000.

Catalogue on Hitachi Chemical Substance Total Management Supporting System issued on Jun. 1999.

Patent Abstracts of Japan, vol. 1995, No. 08, Sep. 29, 1995, & JP 07 121588 A (Nippon Steel Corp), May 12, 1995.

Patent Abstracts of Japan, vol. 2000, No. 04, Aug. 31, 2000, & JP 2000-029900 A (Hitachi Ltd), Jan. 28, 2000.

"Ecology Information Systems for Circulatory Society," Hitachi Hyoron Sha, pp. 31-34, vol. 81-12.

"Chemical Substance Total Management System," Hitachi Hyoron Sha, Jan. 1, 2000, p. 110, vol. 82-1.

* cited by examiner

FIG. 2

MATERIAL COMPOSITION DATA /104

MATERIAL NAME XX RAW MATERIAL

| CAS NUMBER | COMPOSITION COMPONENT | CONTENT |
|---|---|---|
| 7439-97-6 | MERCURY | 5~10% |
| 75-01-4 | VINYL CHLORIDE | 40~50% |

MANAGING SUBSTANCE DATA /105

| CAS NUMBER | MANAGING SUBSTANCE | JAPAN FEDERATION OF ECONOMIC ORGANIZATIONS | A INDUSTRIAL SOCIETY |
|---|---|---|---|
| 557-20-0 | DIETHYL ZING | | ○ |
| 79-06-1 | ACRYLAMIDE | ○ | ○ |

PHYSICAL PROPERTY DATA: MOLAR WEIGHT 71.1 VAPOR PRESSURE MELTING POINT 84.5°C WATER SOLABILITY BOILING POINT 87°C SPECIFIC WEIGHT

RELEASE COEFFICIENT DATA /106

| PROCESS | MANAGING SUBSTANCE | RELEASING AND TRANSFERRING DESTINATION | RELEASE COEFFICIENT |
|---|---|---|---|
| A DEPARTMENT WASHING | XYLENE | ATMOSPHERE | 0.001 |
| A DEPARTMENT WASHING | XYLENE | WASTE | 0.3 |
| A DEPARTMENT WASHING | BENZENE | WATER | 0.001 |
| B DEPARTMENT ASSEMBLING | METHYLENE CHLORIDE | WASTE | 0.9 |

MSDS DATA /102

[MANAGING SUBSTANCE NAME] ZINC OXIDE

CHEMICAL NAME:
 CHINESE WHITE
ENGLISH NAME:
 ZINC WHITE
 COLUMNAR

MATERIAL PRICE
MANUFACTURING METHOD
APPLICATION
PRODUCTION
HANDLE WITH CARE
PACKAGE FORM
TOXIC EFFECT (APPLICABLE LAW)

ORGANICATION: Abc BUSINESS OFFICE

| MANAGING SUBSTANCE | | ATMOSPHERE | DRAINAGE | SOIL | WASTE |
|---|---|---|---|---|---|
| NUMBER | NAME | | | | |
| 18-88-3 | TOLUENE | 100kg | 10kg | 1kg | 70kg |
| 7400-38-2 | ARSENIC | 10kg | 1kg | 0kg | 10kg |
| 108-95-2 | PHENOL | 50kg | 50kg | 1kg | 1kg |

⇩

12b

ORGANIZATION: Abc BUSINESS OFFICE
MANAGING SUBSTANCE: TOLUENE

| PROCESS | ATMOSPHERE | DRAINAGE | SOIL | WASTE |
|---|---|---|---|---|
| PAINTING | 80kg | 0kg | 1kg | 50kg |
| WASHING | 10kg | 8kg | 0kg | 10kg |
| SURFACE TREATMENT | 10kg | 2kg | 0kg | 10kg |

⇩

12c

ORGANIZATION: Abc BUSINESS OFFICE
MANAGING SUBSTANCE: TOLUENE
PROCESS: PAINTING

| MATERIAL | ATMOSPHERE | DRAINAGE | SOIL | WASTE |
|---|---|---|---|---|
| ALPHA PAINT | 30kg | 0kg | 0.7kg | 48kg |
| BETA DILUENT | 50kg | 0kg | 0.3kg | 2kg |

⇩

12d

ORGANIZATION: Abc BUSINESS OFFICE
MANAGING SUBSTANCE: TOLUENE
PROCESS: PAINTING
MATERIAL: ALPHA PAINT

| PURCHASER | PURCHASE UNIT | PURCHASE AMOUNT | DATE | BILL NUMBER |
|---|---|---|---|---|
| ○○○○ | 100 | 200kg | 2000.1.1 | 331074029 |
| ××××  | 50 | 100kg | 1999.12.30 | 331074010 |

CHEMICAL SUBSTANCE TOTAL MANAGEMENT SYSTEM, STORAGE MEDIUM STORING CHEMICAL SUBSTANCE MANAGEMENT PROGRAM AND CHEMICAL SUBSTANCE TOTAL MANAGEMENT METHOD

This is a continuation of application Ser. No. 10/884,983 filed 07 Jul. 2004, now U.S. Pat. No. 6,980,883 which is a division of application Ser. No. 09/793,240 filed 26 Feb. 2001, now U.S. Pat. No. 6,778,877 which claims priority to Japanese Patent Application No. 2000-55960 filed in Japan on 28 Feb. 2000, the contents of which are incorporated herein by reference in their entirety.

BACKGROUND OF THE INVENTION

The present invention relates to a chemical substance total management system managing chemical substances contained in materials handled by business entities, a storage medium storing a chemical substance management program and a chemical substance total management program.

In various materials currently commercialized, several hundreds kinds of chemical substances having significant impact to environment are contained. When business entities handle the materials in the processes of manufacturing, transportation, storage and so forth, it has been required to know how much amount of the chemical substances is moved, how much amount of chemical substance is released to the atmosphere, soil and/or water, how much amount of chemical substance has been provided to the market in a form contained in the products. Therefore, the business entities have to manage the chemical substances to be handled by themselves. Hereinafter, the chemical substances to be handled by the business entities will be referred to as "managing substance".

Therefore, legal system has been started to require the business entities to report quantative data of releasing and transferring the managing substances in factories, business offices or in business enterprise to the country and/or the autonomous body to estimate environmental impact of the overall country.

The conventional data collecting system has a function for inputting basic data of the managing substances per division and/or process and aggregately tabulating per unit of superior organization (business office, company). The reason is that as effective document, only this result is required.

Such prior art has been discussed in Special Edition, "Environmental Resource" of December, 1999.

However, since the prior art set forth above is merely designed for preparing the effective document under the legal system, no consideration has been given for particular method for reducing problematic managing substance. Namely, by merely displaying or printing the final release or transferring destination (atmosphere, water, soil or the like) of the managing substance or release and transferring amount, it cannot be known to the business entity, in which material, the managing substance is contained or in which process, the managing substance is handled. Therefore, the business entity may not take any particular measure for reducing release amount or transferring amount (hereinafter releasing and transferring amount) of the managing substance.

SUMMARY OF THE INVENTION

Therefore, an object of the present invention is to provide a chemical substance total management system aiding for reduction of release and transferring amount of managing substances in business entities.

The present invention retrieves releasing and transferring amount record relating to predetermined managing substance on the basis of total tabulation link information with correlation between the tabulation result record managing releasing and transferring amount of managing substance per releasing and transferring destination and releasing and transferring amount record to be a source generating tabulation result record.

On the other hand, the present invention retrieves substance transferring amount record relating to a predetermined process in the basis of substance handling amount record and material handling amount record as a source of generation of the handling amount record, and retrieving material handling amount record relating to retrieved substance transferring amount record on the basis of process tabulation link information between the releasing and transferring amount record and substance handling amount record as a source of generation of the releasing and transferring amount record.

According to the first aspect of the present invention, a chemical substance total management system for managing chemical substances contained in the materials handled by business entity, comprises:

a result database storing releasing and transferring amount record managing processes, in which materials are handled, managing substances contained in the materials and releasing and transferring amount per releasing and transferring destination of the managing substances in the process, with correspondence;

a retrieval processing portion retrieving the process, in which materials containing a predetermined managing substance designated on the basis of the releasing and transferring amount record, is handled, and releasing and transferring amount of the designated predetermined managing substance per releasing and transferring destination in the process; and a display processing portion displaying the process, in which the materials containing the designated predetermined managing substance are handled and releasing and transferring amount of the designated predetermined managing substance per the releasing and transferring destination in the process.

According to the second aspect of the present invention, a chemical substance total management system for managing chemical substances contained in the materials handled by business entity, comprises:

a result database storing releasing and transferring amount record managing processes, in which materials are handled, managing substances contained in the materials and releasing and transferring amount per releasing and transferring destination of the managing substances in the process, with correspondence;

a releasing coefficient database storing releasing and transferring coefficient of the managing substance in the process per releasing and transferring designation;

an input processing portion receiving a designation of a predetermined process;

a retrieval processing portion retrieving materials to be handled in designated predetermined process and releasing and transferring amount of the managing substance in the material per releasing and transferring destination on the basis of the material handling amount record and the substance handling amount record; and a display process portion displaying materials to be handled by the designated predetermined process and releasing and transferring amount of the managing substance in the material per releasing and transferring destination.

According to the third aspect of the present invention, a chemical substance total management system managing chemical substance contained in a material handled by a business entity comprises:

a total tabulation processing portion tabulating releasing and transferring record managing process, in which materials are handled, managing substances contained in the material, releasing and transferring amount of the managing substance in the process per releasing and transferring destination, with correspondence, into at least one of organization, in which the material is handled or a period, in which a period of the material is handled, to generate a tabulation result record managing releasing and transferring amount of the managing substance per releasing and transferring destination, and generating total tabulation link information correlating the releasing and transferring amount record and the tabulation result record;

an input processing portion receiving a designation of the managing substance in the tabulation result record;

a retrieving process portion retrieving releasing and transferring amount record relating to the substance designated on the basis of the total tabulation link information; and a display processing portion displaying releasing and transferring amount of the managing substance in the process per releasing and transferring destination on the basis of retrieved releasing and transferring amount record.

According to the fourth aspect of the present invention, a chemical substance total management system managing chemical substance contained in a material handled by a business entity comprises:

a process tabulation processing portion generating substance handling amount record managing handling amount of the managing substance in a process on the basis of a material handling amount record managing process, in which materials are handled, and handling amount of the material in the process with correspondence, managing substance contained in the material and content of the managing substance in the material, and generating a process tabulation link information correlating the material handling amount record and the substance handling amount record;

an evaluation tabulation processing portion generating releasing and transferring amount record managing releasing and transferring amount of the managing substance in the process per releasing and transferring destination on the basis of the substance handling amount record and releasing and transferring coefficient of the managing substance in the process per releasing and transferring destination, and generating evaluation tabulation link information correlating the substance handling amount record and the releasing and transferring amount record;

a retrieval processing portion retrieving substance transferring amount record on the basis of the evaluation tabulation link information and retrieving material handling amount record relating to the substance transferring amount record on the basis of the process tabulation link information; and a display processing portion displaying releasing and transferring amount of the managing substance in the material per releasing and transferring destination on the basis of retrieved substance transferring amount record and retrieved material handling amount record.

According to the fifth aspect of the present invention, a chemical substance total management system managing chemical substance contained in material handled by business entity, comprises:

a material handling amount record managing the process handling the material and handling amount of the material in the process with correspondence;

a substance handling amount record managing the process, managing substance contained in the material and handling amount of the managing substance in the process with correspondence;

a releasing and transferring amount record managing the process, the managing substance and releasing and transferring amount of managing substance in the process per releasing and transferring destination with correspondence;

a tabulation result record managing at least one of organization handling the material or period of handling the material, the managing substance, and the releasing and transferring amount with correspondence;

an evaluation tabulation link information correlating the substance handling amount record and the releasing and transferring amount record; and a total tabulation link information correlating the releasing and transferring amount record and the tabulation result record.

According to the sixth aspect of the present invention, a recording medium storing a chemical substance total management program to be executed in a chemical substance total management system managing chemical substance contained in material handled by business entity, comprises:

reception process of receiving a designation of a predetermined managing substance;

retrieval process of retrieving releasing and transferring amount record corresponding to releasing and transferring amount per releasing and transferring destination of the management substance in the process designated from the releasing and transferring amount record managing the process handling material containing managing substance and releasing and transferring amount of the managing substance in the process per releasing and transferring destination; and displaying process displaying the process handling the material containing the designated predetermined managing substance and releasing and transferring amount of the managing substance in the process per releasing and transferring destination with correspondence on the basis of the retrieved releasing and transferring amount record.

According to the seventh aspect of the present invention, a recording medium storing a chemical substance total management program to be executed in a chemical substance total management system managing chemical substance contained in material handled by business entity, comprises:

reception process of receiving a designation of a predetermined managing substance;

retrieval process retrieving material handling amount record and substance handling amount record corresponding to a predetermined process designated from material handling amount recording managing process handling the material and handling amount of the material in the process with correspondence and substance handling amount record managing the process, managing substance contained in the material in the process with correspondence;

displaying process displaying material handled in the predetermined process designated and releasing and transferring amount of the managing substance in process per releasing and transferring destination on the basis of retrieved material handling amount record and retrieved substance handling amount record.

According to the eighth aspect of the present invention, a chemical substance total management method managing chemical substance contained material handled by business entity, displaying a breakdown of releasing and transferring amount of managing substance per releasing and transferring destination relating to a process handling material containing the managing substance when name of the managing substance is designated on a display screen displayed name of managing substance and releasing and transferring amount of the managing substance with correspondence.

According to the ninth aspect of the present invention, a chemical substance total management method managing chemical substance contained material handled by business entity, displaying a breakdown of releasing and transferring amount of managing substance per releasing and transferring destination relating to a process handling material containing the managing substance when name of the process is designated on a display screen displayed the name of process handling the material containing managing substance and releasing and transferring amount of the managing substance in the process per releasing and transferring destination with correspondence.

According to the tenth aspect of the present invention, a chemical substance total management method managing chemical substance contained material handled by business entity, displaying a breakdown of releasing and transferring amount of managing substance per releasing and transferring destination relating to a process handling material containing the managing substance when name of the managing substance is designated on a display screen displaying the name of managing substance and releasing and transferring amount of managing substance per releasing and transferring destination with correspondence.

According to the eleventh aspect of the present invention, a chemical substance total management method managing chemical substance contained material handled by business entity, displaying a breakdown of releasing and transferring amount of managing substance per releasing and transferring destination relating to a process handling material containing the managing substance when name of process is designated on a display screen displaying name of process handling material containing the managing substance and releasing and transferring amount of managing substance in process per releasing and transferring destination with correspondence.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 2 is a conceptual illustration showing an example of a data structure of a database in one embodiment of the chemical substance total management system according to the present invention;

FIG. 12 is an illustration showing a display input screen image of one embodiment of the chemical substance total management system according to the present invention.

DETAILED DESCRIPTION OF THE PREFERRED EMBODIMENTS

The present invention will be discussed hereinafter in detail in terms of the preferred embodiment of a chemical substance total management system, a storage medium storing a chemical substance total management program and a chemical substance total management method according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Incorporate By Reference

Whole disclosure of co-pending U.S. Patent Application Serial No. (not yet known), for CHEMICAL SUBSTANCE TOTAL MANAGEMENT SYSTEM AND CHEMICAL SUBSTANCE TOTAL MANAGEMENT METHOD" filed with claiming convention priority based on Japanese Patent Application No. 2000-81722, filed on Mar. 17, 2000, is herein incorporated by reference.

Figure 1:
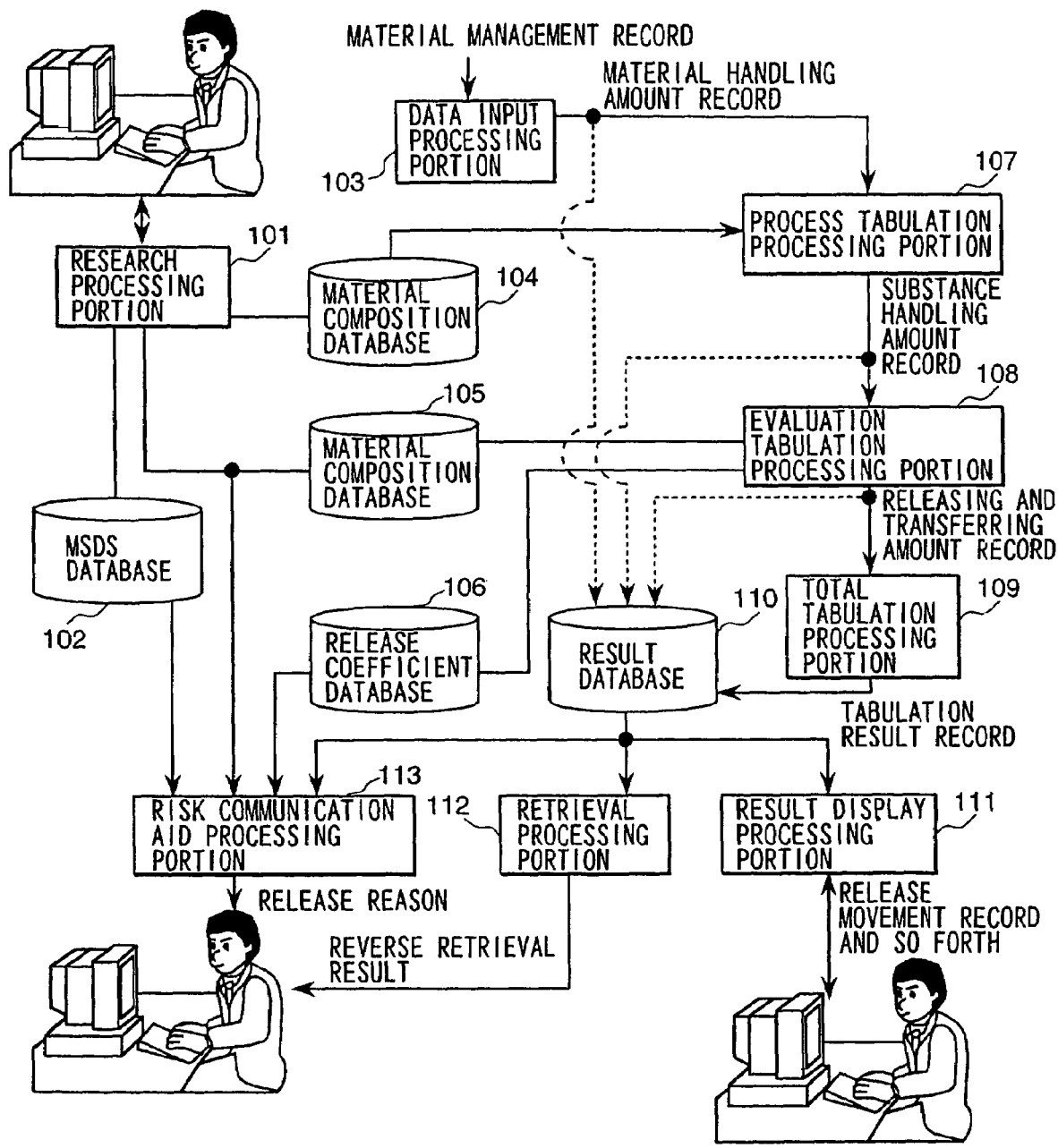
FIG. 1 is a block diagram showing a construction of one embodiment of a chemical substance total management system according to the present invention.

FIG. 1 is a block diagram showing a construction of the preferred embodiment of a chemical substance total management system according to the present invention.

The chemical substance total management system includes a research processing portion 101, a MSDS database 102, a data input processing portion 103, a material composition database 104, a managing substance database 105, a release coefficient database 106, a process tabulation processing portion 107, a evaluation tabulation processing portion 108, a total tabulation processing portion 109, a result database 110, a result display processing portion 111, a retrieval processing portion 112 and a risk communication aid processing portion 113.

The MSDS database 102 stores items of notandum in handling of materials, product safety data sheet (MSDS) indicative of harmful effect, correspondence to laws and rules in a form of database per material. The material herewith referred to includes a raw material to charge stock of completed product (e.g. rough substance, such as ore, crude oil and so forth, primary processed product, such as steel plate or the like, half-finished product, such as substrate or the like), one used for production of complete product (e.g. coating agent, cleaning agent, paint, cooling agent). The complete product herewith referred to is products which are shipped by the business entity as product, such as automobile, camera, personal computer, film, television set, CPU, plate member, cable, clothes, foods, building, electric power, water and so forth.

The material composition database 104 stores material composition information in a form of database.

One material is normally consisted of a plurality of substances, namely molecules. For the substances (molecules), CAS (Chemical Abstract Services) number and other identifier is present. Therefore, a record of material composition database 104 is preferably consisted of a material name, an identifier of managing substance contained in the material (for example, name of managing substance, CAS number of the managing substance or the like), lower limit and upper limit of content of managing substance (preferably, mass rate) in a form of field. Managing substances herewith referred to are substances requiring management as substances significantly affecting for environment or its peripheral substance as chemical substance (first-class designated chemical substance) taken as object in PRTR law (law relating to keep track release amount of particular chemical substance to environment and promoting improvement of management: Pollutant Release and Transfer Register law") or chemical substances to be object in chemical substance management guideline or environment protection guideline or the like of state or GDM (Government-Designated Municipalities). For example, the managing substances herewith referred to may be toluene, xylen acid, methyl isobutyl ketone (MIBK), isopropanol, chromate salt, epoxy resins, methylene chloride, benzene, dimethyl zinc, acrylamide, mercury, vinyl chloride or the like.

The managing substance database 105 is a database listing up the managing substances and stores record group taking arbitrary genre (poisonous substance, deleterious substance, managing object, law and regulation defined substance, self-management substance and so forth) and identifier of corresponding managing substance as field. The managing substance database 105 also stores record group taking the identifier of the managing substance and physical property as field. As the physical property, a coefficient in the case of converting the molecular weight into a pure metal mass weight, vapor pressure density and so forth are included.

A release coefficient database 106 stores records taking managing substances per releasing destination (atmosphere, water, soil, consumption, charged disposal, recycling, containment in product) and releasing and transferring amount of the managing substance (preferably ratio by weight). Process herewith referred to is production process of product by the business entity, inspection process of the product, development process of the product, and includes molding process, processing process, heat treatment process, painting process, washing process, etching process, surface treatment process, assembling process and so forth. For example, it is data representing release of 80% of toluene as component of a paint A to atmosphere relation to charging of the pain A in certain painting process in the production line in certain division.

The research processing portion 101 has a function for retrieval of field mutually common from record group stored in the MSDS database 102, the material composition database 104, the managing substance database 105, the discharge coefficient database 106 with establishing association, retrieval with identifier, such as name of managing substance, CAS number or the like, retrieval of record in partial matching with respect to texts in the field for outputting as screen image or file.

The result database 110 is a database storing record used by data input processing portion 103, process tabulation processing portion 107, evaluation tabulation processing portion 108, total tabulation processing portion 109, resultant record (material handling amount record, substance handling amount record, release and transfer amount record, tabulation result record and so forth) and link information between the records (process tabulation link information, evaluation tabulation link information, total tabulation link information or so forth) The result display processing portion 111 retrieves the content of the result database 110, reads out and displays various tabulation results. For example, the name of managing substance the CAS number of the managing substance, releasing and transferring destination of the managing substance per releasing and transferring destination, total releasing and transferring amount summed the releasing and transferring amount per releasing and transferring destination are displayed with correspondence, or the name of managing substance the CAS number of the managing substance, division handled the managing substance, the process, in which the material containing the managing substance is contained and annual handling amount of the managing substance in the process are displayed with correspondence.

The risk communication aid processing portion 113 serves not only for establishing mutual relationship is in process of data stored in the MSDS database 102, the material composition database 104, the managing substance database 105 and discharge coefficient database 106 but also for tracing the link information in the meaning with respect to the field of each record. In risk communication, it is important to resolve the fear of residents relating to release of the managing substance. It is necessary to inspect prehistory of releasing of the substance with identifying the process or material and to establish communication with make reference to the characteristics of the process (including height of exhaust flue and so forth), safety data of the material. Therefore, concerning the material, the material composition data of the material is retrieved from the material composition database 104 to output and display. On the other hand, concerning the managing substance, the managing substance data is retrieved from the managing substance database 105 to output and display. On the other hand, a release coefficient data of the managing substance related to the process is retrieved from the release coefficient database 106 to output and display. With this function, concerning inquiry relating to the releasing and transferring data from the near neighbors and/or interested parties, communication can be established with confidence on the basis of reasonable data.

The storage medium (e.g. floppy disk, hard disk, memory card, memory stick, MO, PD, CD-ROM. CD-R/RW, DVD- ROM. DVD-RAM) performs researching process performed by research processing portion 101, data input process to be performed by the data input processing portion 103, a process tabulation process performed by the process tabulation processing portion 107, evaluation tabulation process to be performed by the evaluation tabulation processing portion 108, total tabulation process to be performed by total tabulation processing portion 109, the result display process to be performed by the z111, the retrieval process to be performed by retrieval processing portion 112, risk communication aiding process to be performed by risk communication aid processing portion 113, input process to be performed by an input processing portion 114 and display switching process to be performed by a display switching portion 115, and displaying process to perform display processing portion 116, to execute the chemical substance total management system.

The storage medium (e.g. floppy disk, hard disk, memory card, memory stick, MO, PD, CD-ROM. CD-R/RW, DVD-ROM. DVD-RAM) storing the shown embodiment of the chemical substance total management program according to the present invention includes MSDS data stored in the MSDS database 102, material composition data stored in the material composition database 104, managing substance data storing the managing substance database 105, release coefficient data stored in the discharge coefficient database 106 and result data (e.g. material handling amount record, the substance handling record, the releasing and transferring amount record, tabulation result record, process tabulation link information, the evaluation tabulation link information, total tabulation link information.

FIG. 2 shows an example of data structure of the database in the shown embodiment of the present invention. In the material composition database 104, data establishing correspondence between the CAS number of the managing substance contained in the material and upper limit and lower limit of the content of the managing substance (preferably, Wt %) is stored per material with taking the material as key index. As material name, tradename or product number upon purchased by the business entity may be used. However, any identification uniquely determined code system may be used.

The managing substance database 105 stores the managing substance data, such as data of correspondence between the managing substance and the corporate body by which the managing substance is designated and physical property of the managing substance with taking the CAS number of the managing substance as key index. The physical property herewith referred to is property of the managing substance, such as molecular weight, melting point, boiling point, vapor pressure, water solubility, specific weight and so forth.

The release coefficient database 106 stores the release data which is data, in which the managing substance handled in the process, releasing and transferring destination of the managing substance and the release coefficient of the managing substance are corresponded with taking the process of the business entity as key index. The release coefficient of the managing substance is releasing and transferring ratio (preferably, weight ratio) per releasing and transferring destination of the managing substance.

In the MSDS database 102, data including chemical name of the managing substance, English name, CAS number, description, raw material, price, preparation method, application, packaging type, notandum in handling the managing substance, toxic effect, applicable law and regulation and so forth is stored with taking the MSDS data, namely managing substance or material as key index.

Figure 3:
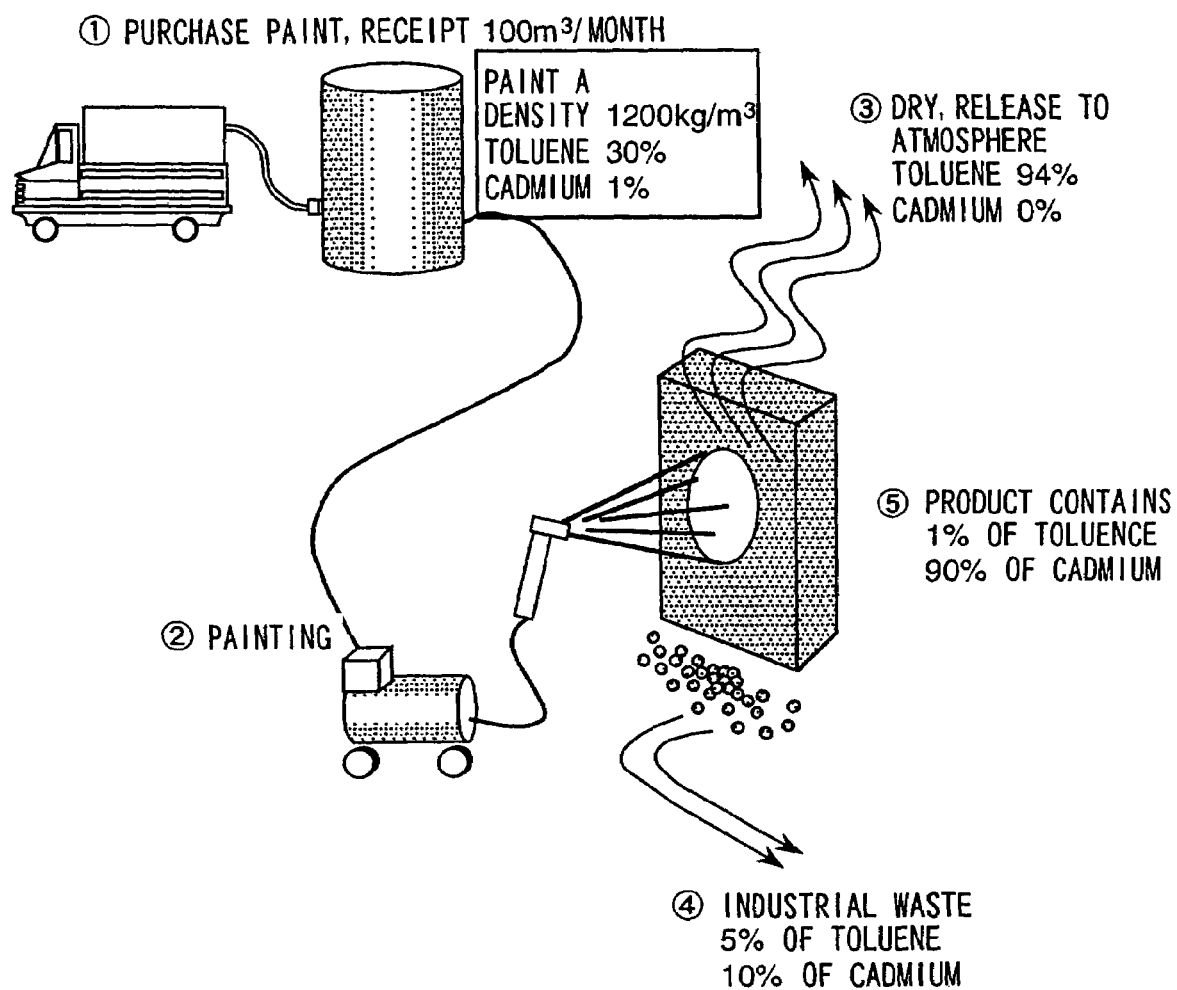
FIG. 3 is a conceptual illustration showing an example of handling of managing substances in one embodiment of the chemical substance total management system according to the present invention.

FIG. 3 shows an example of handling of the managing substance in the shown embodiment of the present invention. Discussion will be given in order of numbers given in FIG. 3.

The shown example is started in purchasing the paint A as material (procedure ①). A purchase amount of the paint A is 100 $m^3$/month, a storage amount in a tank is typically constant. Therefore, a handling amount in the process is premised as 100 $m^3$/month, similarly. AS density of the paint A is 1200 $kg/m^3$, handling amount thereof is 120000 kg/month. All amount of the paint A is put into a painting process (procedure ②). Process up to here is implemented by the data input processing portion 103.

Next, it can be read out the material composition database 104 that the paint A contains 30% of toluene and 1% of cadmium. Therefore, handling amount of the managing substance in the paining process is derived as 36000 kg/month of toluene and 1200 kg/month of cadmium. This calculation is performed by the process tabulation processing portion 107.

Next, in the paining process, painting for the shipping product is performed for applying the paint by spray is performed. During this process, a part of the paint is dried and released to the atmosphere (procedure ③). Releasing rate to the atmosphere of 94% of toluene and 0% of cadmium can be read from the discharge coefficient database 106. Therefore, it can be evaluated that 33840 kg of toluene is released to the atmosphere every month. Similarly, as industrial waste (procedure ④), 1800 kg of toluene and 120 kg of cadmium are disposed per month. It is also evaluated that 360 kg of toluene and 1080 kg of cadmium are contained in the shipping product. These evaluation is implemented by the evaluation tabulation processing portion 108.

Figure 4:
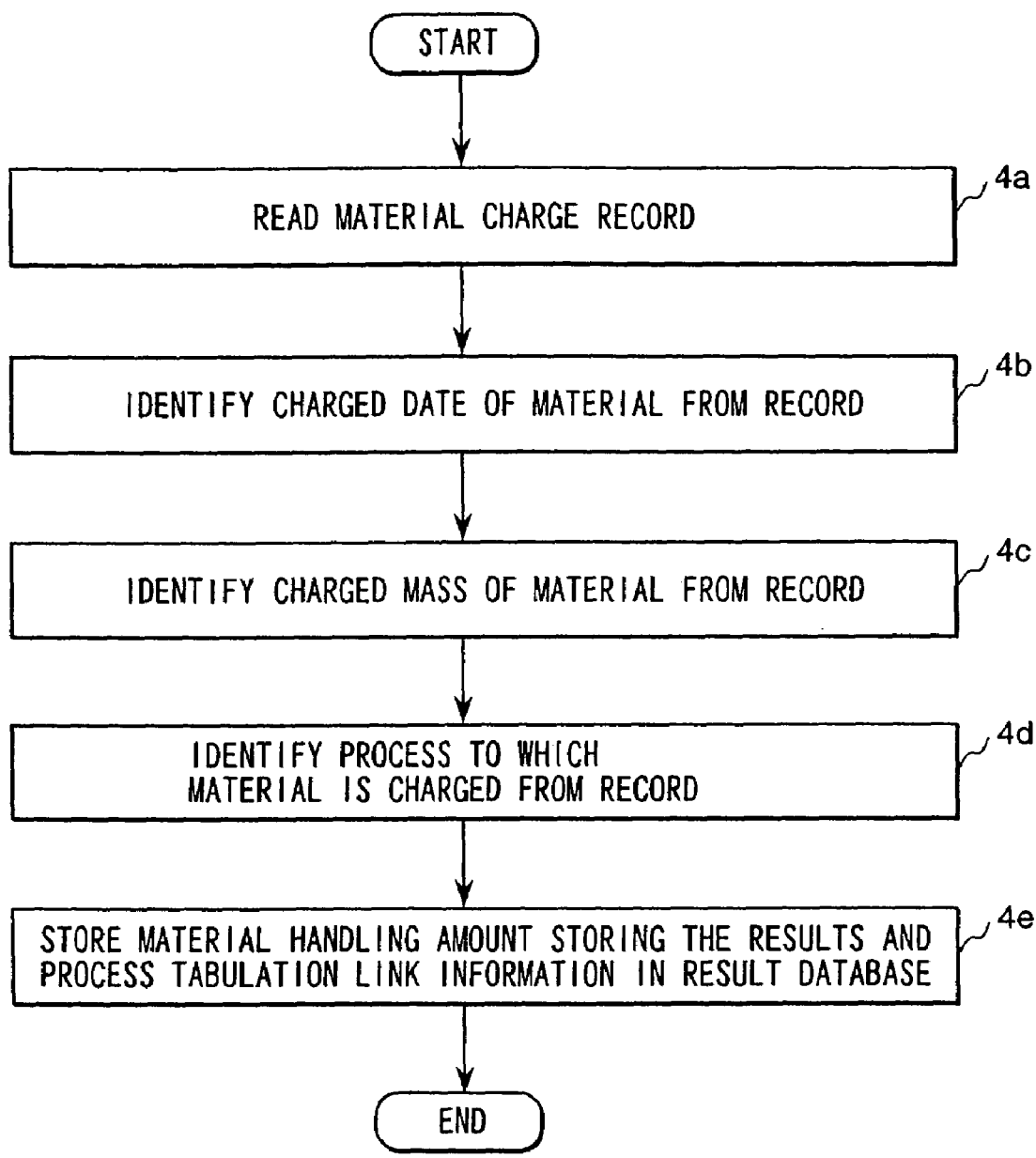
FIG. 4 is a flowchart showing a data input process in one embodiment of the chemical substance total management system according to the present invention.

FIG. 4 is a flowchart showing data input process in the shown embodiment of the present invention.

In the data input processing portion 103, data input process is performed. The data input process includes a reading process 2a, a date identification process 2b, a mass weight identification process 2c, a process identification process 2d and a storing process 2e.

In the data input process, charging of the material and purchasing of the material are read from the material management record, such as material purchasing document, stock control document and so forth. Here, as one example, as the material management record, charge record of the material to the process is read out (read process 2a). From the record, date is identified (date identifying process 2b). Since the purchase record inherently includes data field representative of date data with dominical year or Japanese year, the date data is converted into date data with dominical year. Next, mass weight of the material is identified (mass weight identification process 2c). Thereafter, using an orderer name or the like, process, in which the material is handled, is identified (process identification process 2d). These series of result data is stored in the result data base 110 as process handling amount record (storing process 2e). On the other hand, data input link information as link information correlating the material handling amount record as result record ands the material management record as original record for obtaining the result record is also stored in the result database 110 (storing process 2e).

The link information is information for correlation of the data record and the result record in the case where the data record (original data) preliminarily present in the processing portion (data input processing portion 103, process tabulation processing portion 107, evaluation tabulation processing portion 108, total tabulation processing portion 109) is read out, processed by information process, arithmetic process or tabulation process to generate new data record (result record). In case of one-to-one relationship, correlation can be realized by adding point to one of two records. If both of records are plural and N-to-N relationship is established, pointers to all of the result records are added to the original records, and pointers to all original records are added to the result records. In the alternative, relationship between the original records and the result records may be established in a form of table.

Figure 5:
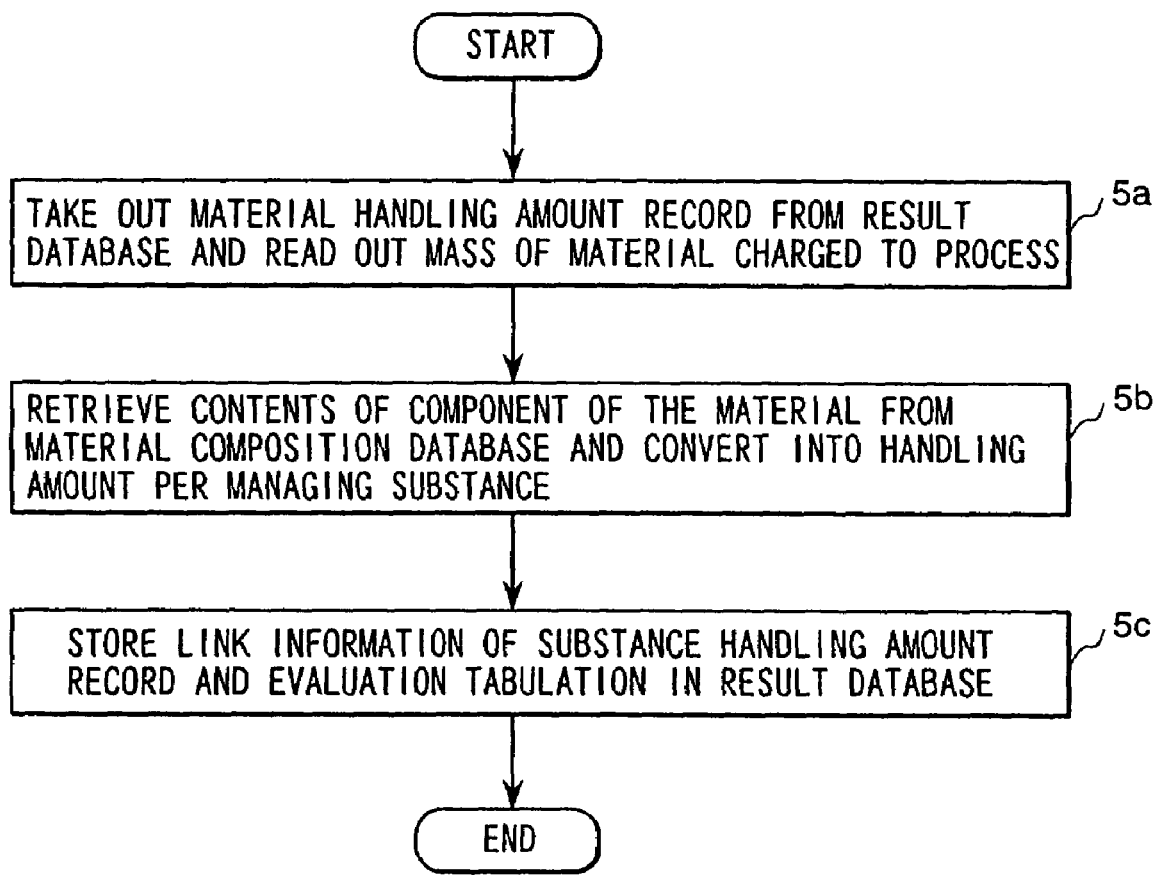
FIG. 5 is a flowchart showing a process tabulation process in one embodiment of the chemical substance total management system according to the present invention.

FIG. 5 is a flowchart showing a process tabulation process in the shown embodiment.

In the process tabulation process portion 107, process tabulation process is performed. The process tabulation process includes a read out process 5a, a conversion process 5b and a storing process 5c.

At first, mass weight charged to the process is read out from the process tabulation process handling amount record stored in the result database 110 (read out process 5a). Next, from the material composition data stored in the material composition database 104, the managing substance contained in the material is retrieved. Then, conversion is performed to convert into the handling amount per managing substance (conversion process 5b). By managing the handling amount of the material in mass weight (kg) and managing the content of the managing substance contained in the material in percent by mass, the handling amount of the managing substance can be obtained in mass weight (kg) by multiplying the mass weight (kg) of the handling amount of the material by the content of the managing substance contained in the material. Finally, the process tabulation link information as the link information between the substance handling amount record as the result record and the process handling record and the material composition record as original record, is also stored in the result database 110 (storing process 5c).

Figure 6:
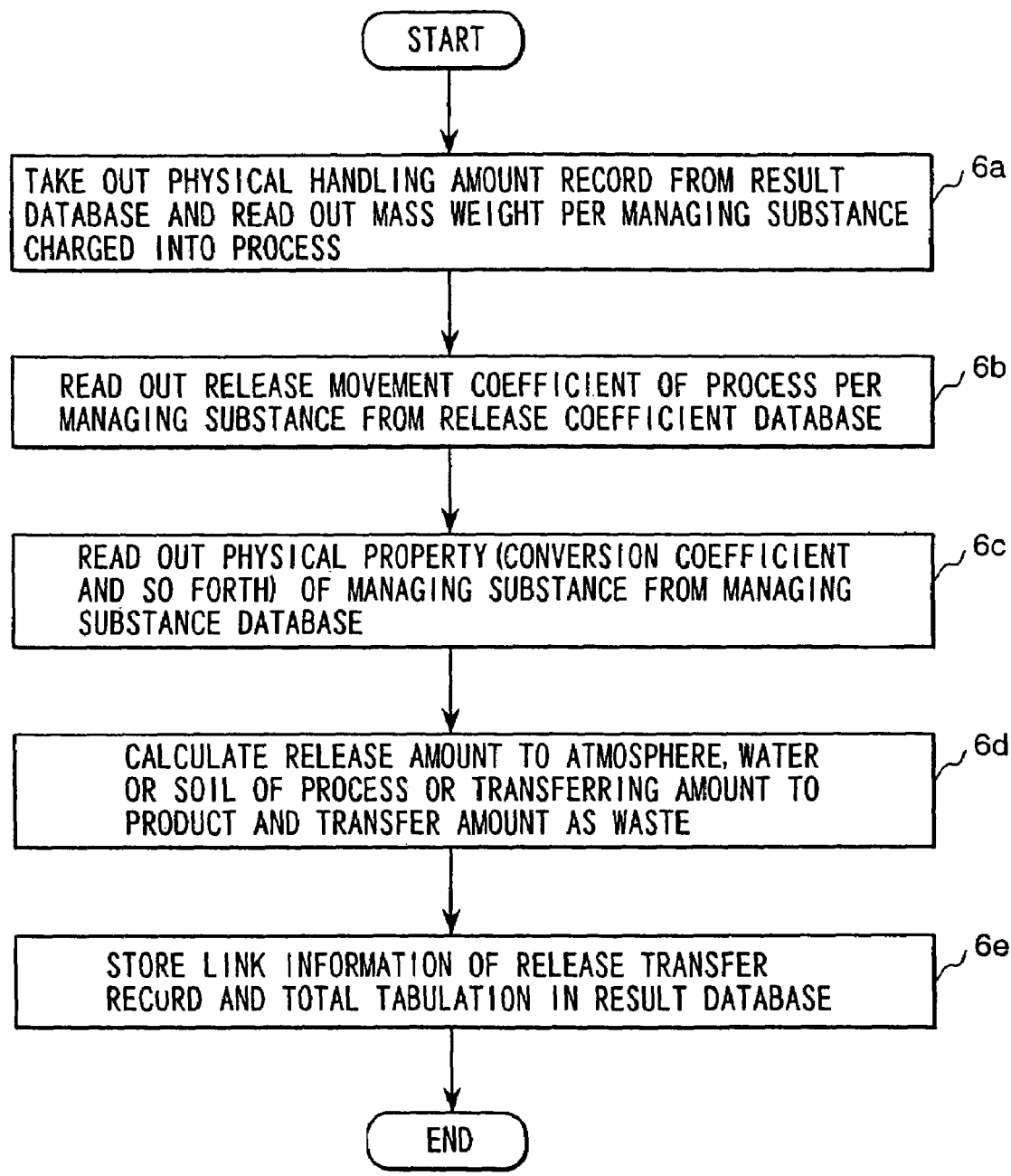
FIG. 6 is a flowchart showing an evaluation tabulation process in one embodiment of the chemical substance total management system according to the present invention.

FIG. 6 is a flowchart of the evaluation tabulation process in the shown embodiment of the present invention.

In the evaluation tabulation processing portion 108, evaluation tabulation process is performed. The evaluation tabulation process includes a reading process 6a, 6b and 6c, a calculation process 6d and a storing process 6e.

The mass weight per managing substance charged to the process from the substance handling amount record stored in the result database 110 (read out process 6a). Next, the releasing and transferring coefficient of the managing substance in the process is read out from the release coefficient data stored in the release coefficient database (read out process 6b). The physical property of the managing substance (conversion coefficient and so forth) is read out from the managing substance data stored in the managing substance database 105 (read out process 6c). Next, releasing amount of the managing data to atmosphere, water, or soul in the process transfer amount to the product, and transfer amount as waste are calculated (calculation process 6d). Since the releasing and transferring coefficient is a value indicative of a ratio between a handling amount of the managing substance in the process and releasing and transferring amount of the managing substance in the process, the releasing and transferring amount of the managing substance per releasing and transferring destination can be calculated by multiplying the handling amount of the managing substance by the releasing and transferring coefficient. When the substance is metal salt, pure metal element as released or transferred managing substance is required. In this case, using the physical property data of the managing substance, the mass weight of the pure metal element is derived through conversion. Finally, the evaluation tabulation link information as link information between the releasing and transferring amount record as the result record and the substance handling amount record and the release coefficient record as original records, is stored in the result database 110 (storing process 6e).

Figure 7:
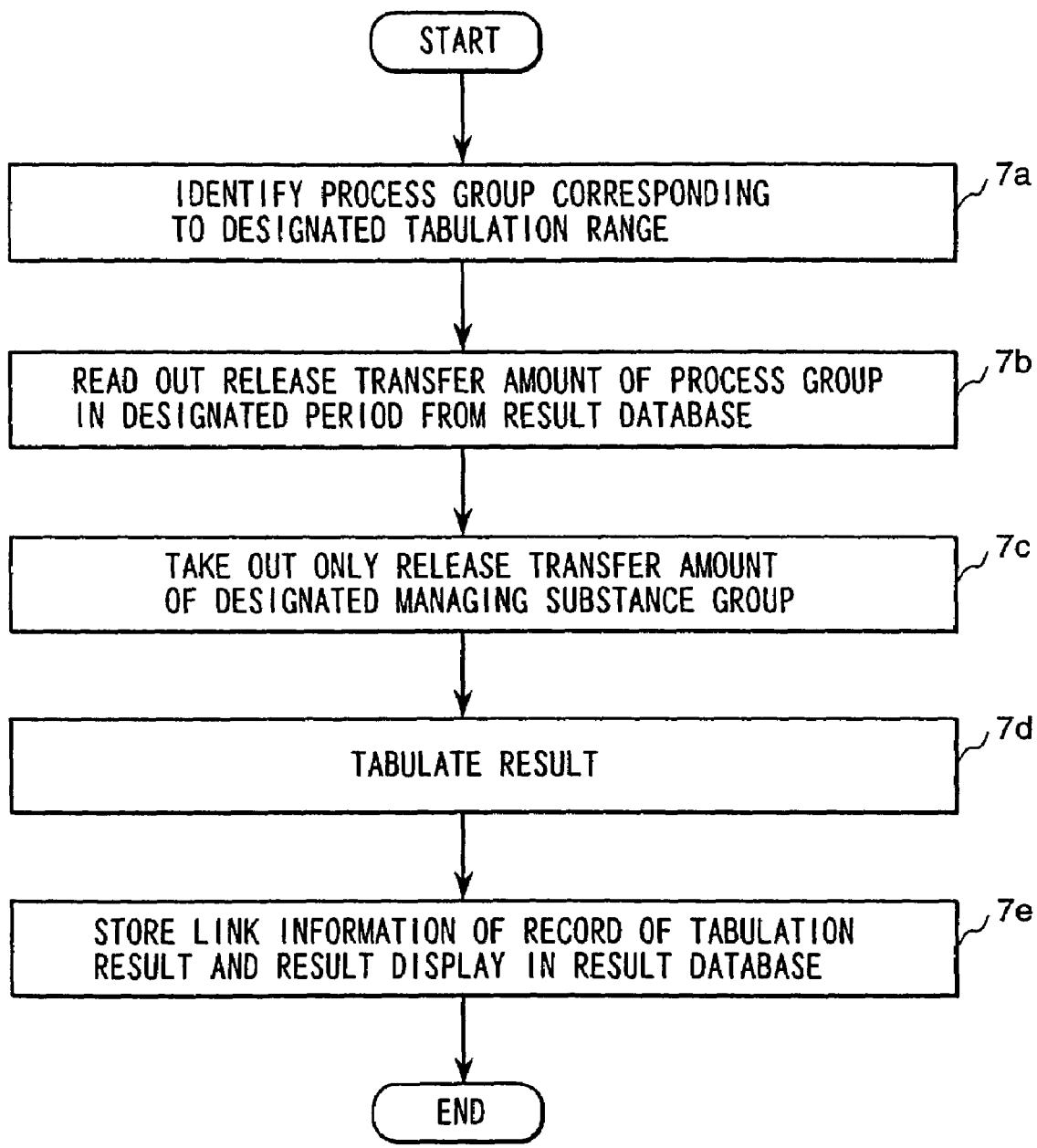
FIG. 7 is a flowchart showing a total tabulation process in one embodiment of the chemical substance total management system according to the present invention.

FIG. 7 is a flowchart showing a total tabulation process in the shown embodiment of the present invention.

In the total tabulation processing portion 109, total tabulation process is performed. The total tabulation process includes a process identification process 7a, a read out process 7b, a read out process 7c, a tabulation process 7d and a storing process 7e.

At first, a process group corresponding to designated tabulation range (for example, workplace, division, section, line, process step, business office, business group, area and so forth), is identified (process identification process 7a). Then, the releasing and transferring amount record of the process group in the designated period (e.g. from Apr. 1, 1999 to May 31, 1999(is read out from the result database (read out process 7b). Furthermore, only releasing and transferring amount record of the designated managing substance group (for example, designated substances of Environment Agency (Japan)) is taken out (read out process 7c). These records are tabulated (tabulation process 7d). It should be noted that the designation of the tabulation range, the designation of the period and the designation of the managing substance group are performed by the research processing portion 101. Finally, a total tabulation link information as the link information between the tabulation result record as the result record and the releasing and transferring amount record as original data, is stored in the result database (storing process 7e).

Figure 8:
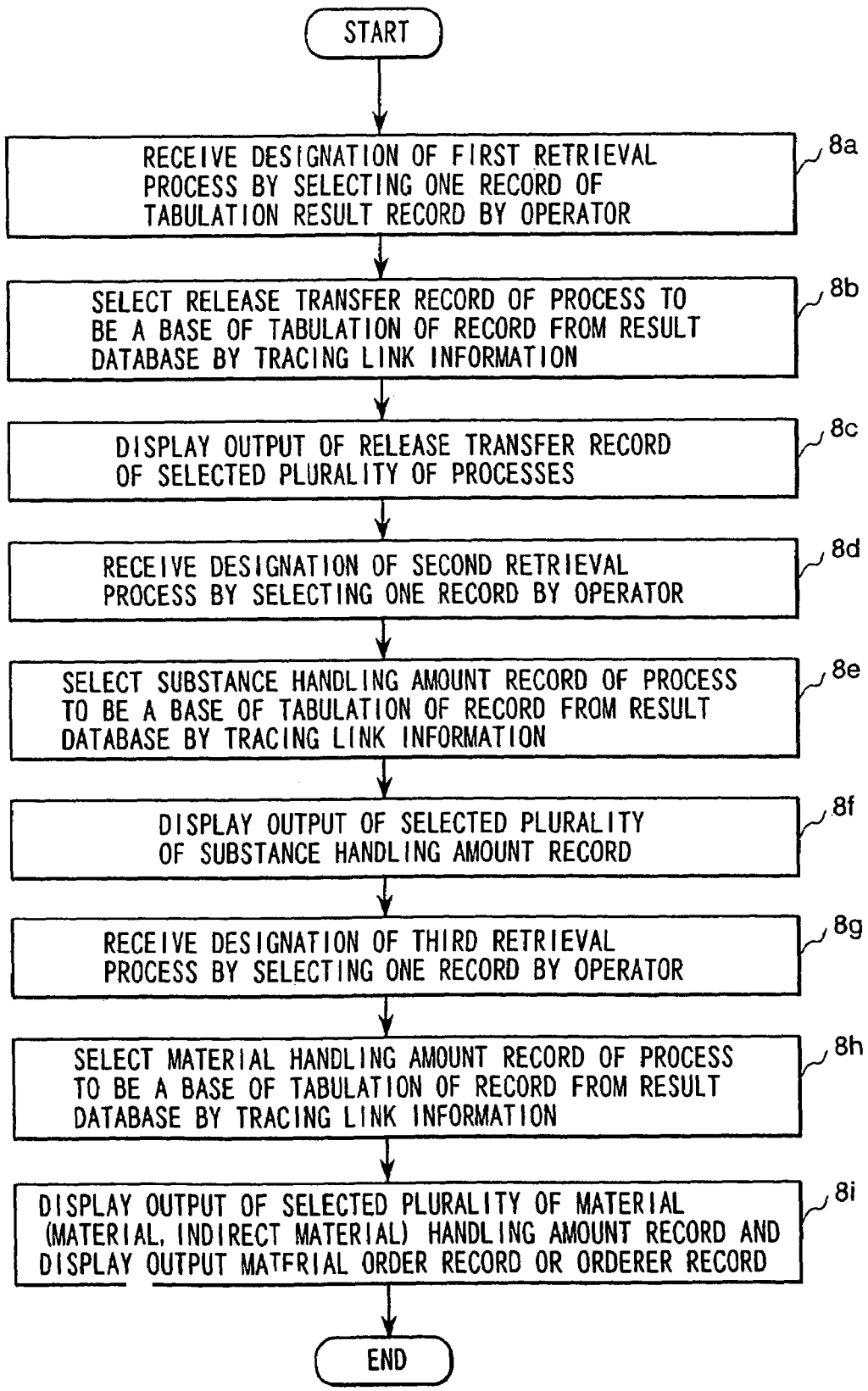
FIG. 8 is a flowchart showing a retrieval process in one embodiment of the chemical substance total management system according to the present invention.

FIG. 8 is a flowchart of a retrieval process in the shown embodiment of the present invention.

In the retrieval processing portion 112, retrieval process is performed. The retrieval process serves as reverse tracing function and includes a first reception process 8a performing a first stage retrieval process, a first retrieval process 8b, a first display process 8c, a second reception process 8d performing a second stage retrieval process, a second retrieval process 8e, a second display process 8f, a third input process 8g performing a third stage retrieval process, a third retrieval process 8h and a third display process 8i. It should be noted that three retrieval processes, i.e. the first stage retrieval process, the second stage retrieval process and the third stage retrieval process are not essential and at least one of the retrieval process will be sufficient. It can be only first stage retrieval process, the second stage retrieval process or the third stage retrieval process. Also, only two retrieval processes would be sufficient. It can be the first and second stage retrieval processes.

At first, selection of the tabulation result record on an output display image by the operator results in reception of designation of the first stage retrieval process (first reception process 8a). From the result database 110, the releasing and transferring amount record of the process to be a source of tabulation of the tabulation result record is retrieved by tracing the total tabulation link information (first retrieval process 8b). A plurality of retrieved releasing and transferring amount record is output on the display (first display process 8c).

Next, selection of one of the records among a plurality of releasing and transferring amount record on the output display image by the operator results in reception of designation of the second stage retrieval process (second reception process 8d). Then, the substance handling amount record as a source of generation of the releasing and transferring amount record designated from the result database 110, is retrieved by tracing the evaluation tabulation link information (second retrieval process 8e). A plurality of retrieved substance handling amount record is output for displaying (second displaying process 8f).

Selection of one of the records among a plurality of substance handling records on the output display image by the operator results in reception of designation of the third stage retrieval process (third input process 8g). The material handing amount record as a source of generation of the substance handling amount record designated from the result database 110, by tracing the process tabulation link information (third retrieval process 8h). A plurality of selected material handling amount record is output displayed and material order code, orderer code and so forth are also retrieved for outputting on the display (third display process 8i). The display process of the supplementary information is preferred in the shown embodiment of the system but can be omitted.

Figure 9:
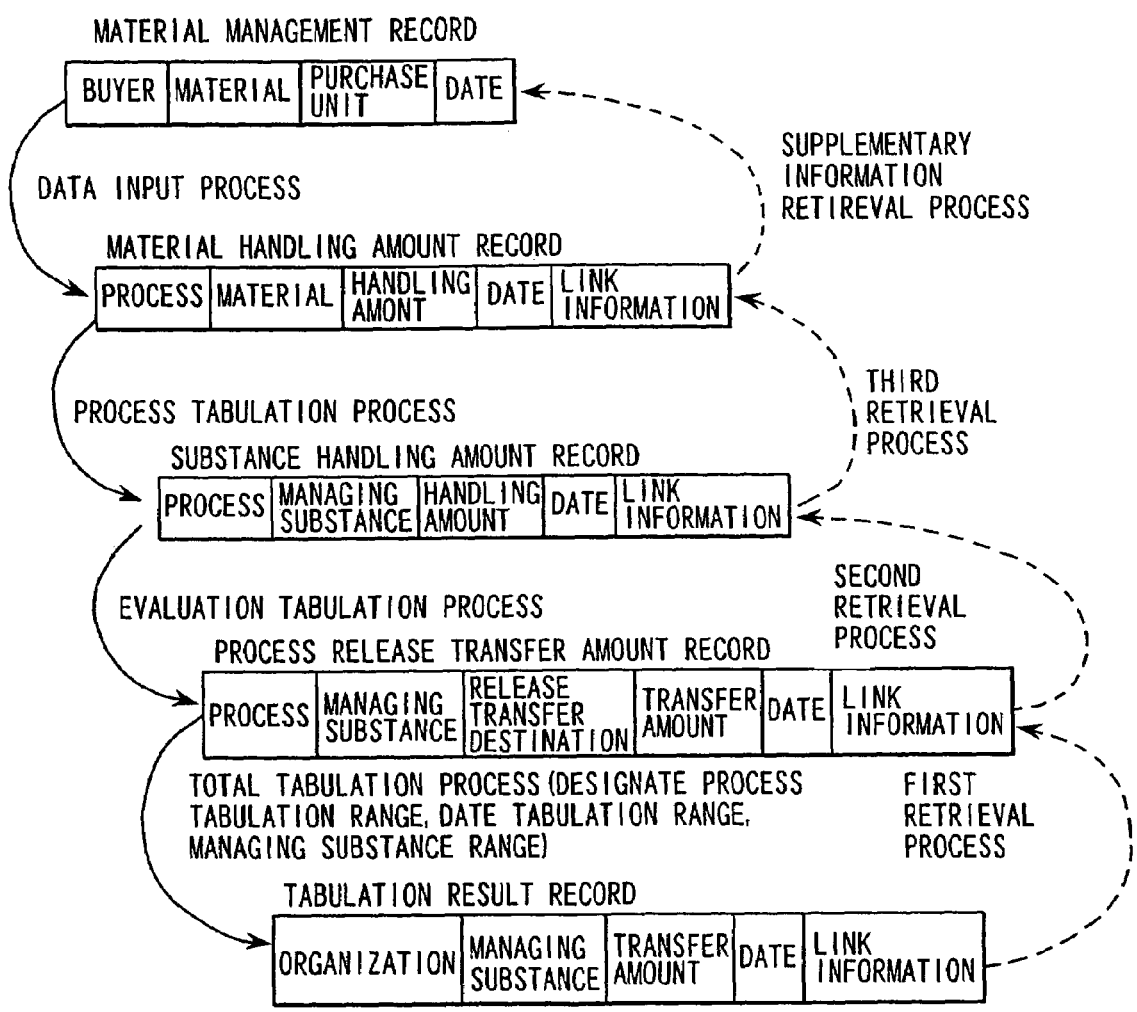
FIG. 9 is a conceptual illustration for supplementary explanation of the tabulation process and retrieval process in one embodiment of the chemical substance total management system according to the present invention.

FIG. 9 is a conceptual illustration for supplementary explanation of the tabulation process and the retrieval process in the shown embodiment of the present invention.

Five kinds of records, i.e. material management record, the material handling amount record, the substance handling amount record, the releasing and transferring amount record and the tabulation result record, are processed or generated in the shown system. The flow shown by the arrow on left side is normal operation process, namely data input process, the process tabulation process, the evaluation tabulation process and total tabulation process. On the other hand, the arrow in wavy line on the right side shows retrieval process using the link information in each record as primary feature of the present invention, i.e. the first retrieval process, the second retrieval process, the third retrieval process and the supplementary information retrieving process.

In FIG. 9, it appears that one record is generated from one record. However, it is possible that a plurality of records are generated from one record, and that one record is generated from a plurality of records. Therefore, the relationship is N-to-N relationship, basically. While it is not required in merely preparing a legal notification document, it is necessary to store a record to be an intermediate course shown in FIG. 9 for implementing the retrieval process. In this case, as new problem, needs to re-generate new records with new condition with erasing existing past record, is caused. For example, in the past, composition information of the material (managing substances contained in the material and contents of the managing substances) are indefinite, definite composition information is obtained recently. At this time, updating process to erase all of corresponding records by designating a range, such as particular period or particular material and to perform re-calculation in new condition.

Figure 10:
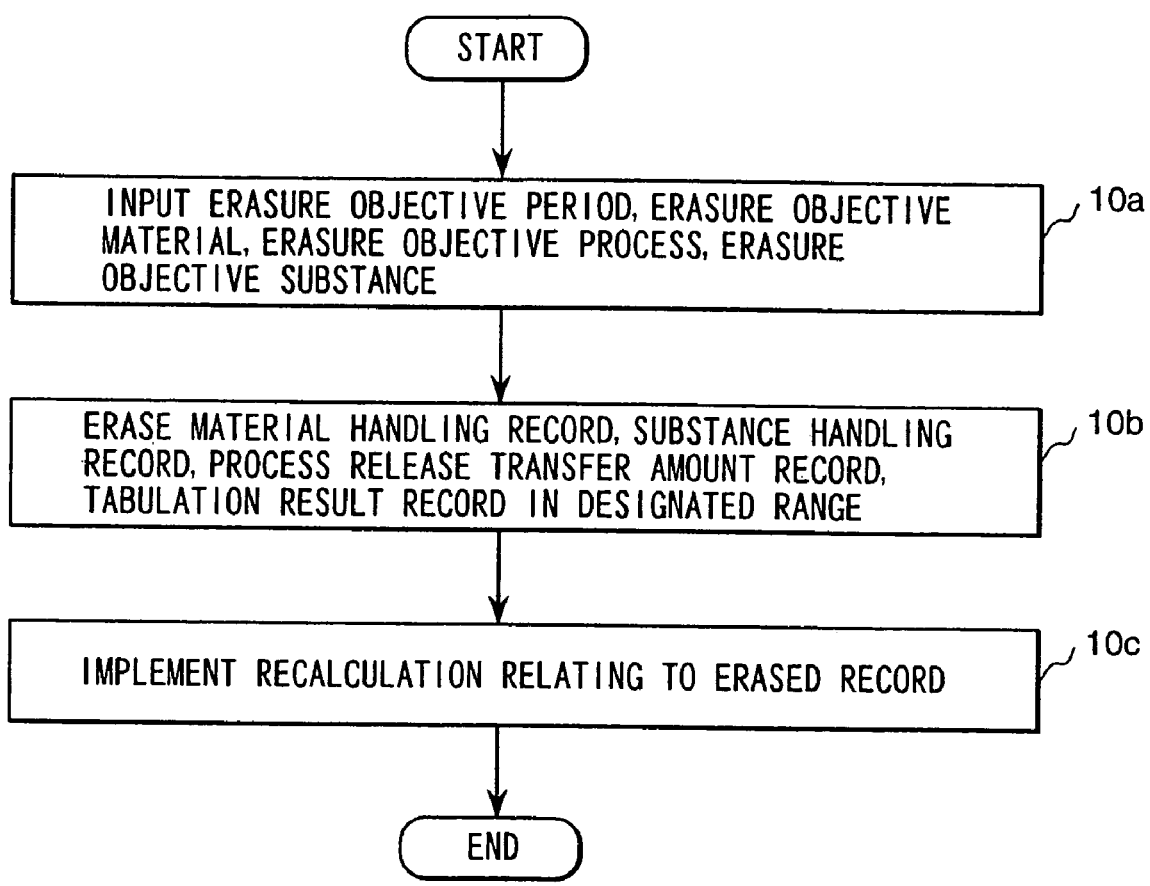
FIG. 10 is a flowchart showing updating process in one embodiment of the chemical substance total management system according to the present invention.

FIG. 10 is a flowchart showing updating process in the shown embodiment of the present invention.

In an updating processing portion (not shown), updating process is performed. The updating process includes an input process 10a, an erasure process 10b and a re-calculation process 11c. The updating process is preferred to be included in the shown system but is not essential for the shown system.

At first, one of the covered period for erasure, covered process for erasure, covered substance for erasure and combination thereof are input to determine a range of records to be erased (input process 10a). Then, material handling amount record, the substance handling amount record, the releasing and transferring amount record and the tabulation result record are erased in the designated range (erasure process 10b).

Finally, on the basis of new information, re-calculation is performed relating to the r¥erased record (re-calculation process 11c).

Figure 11:
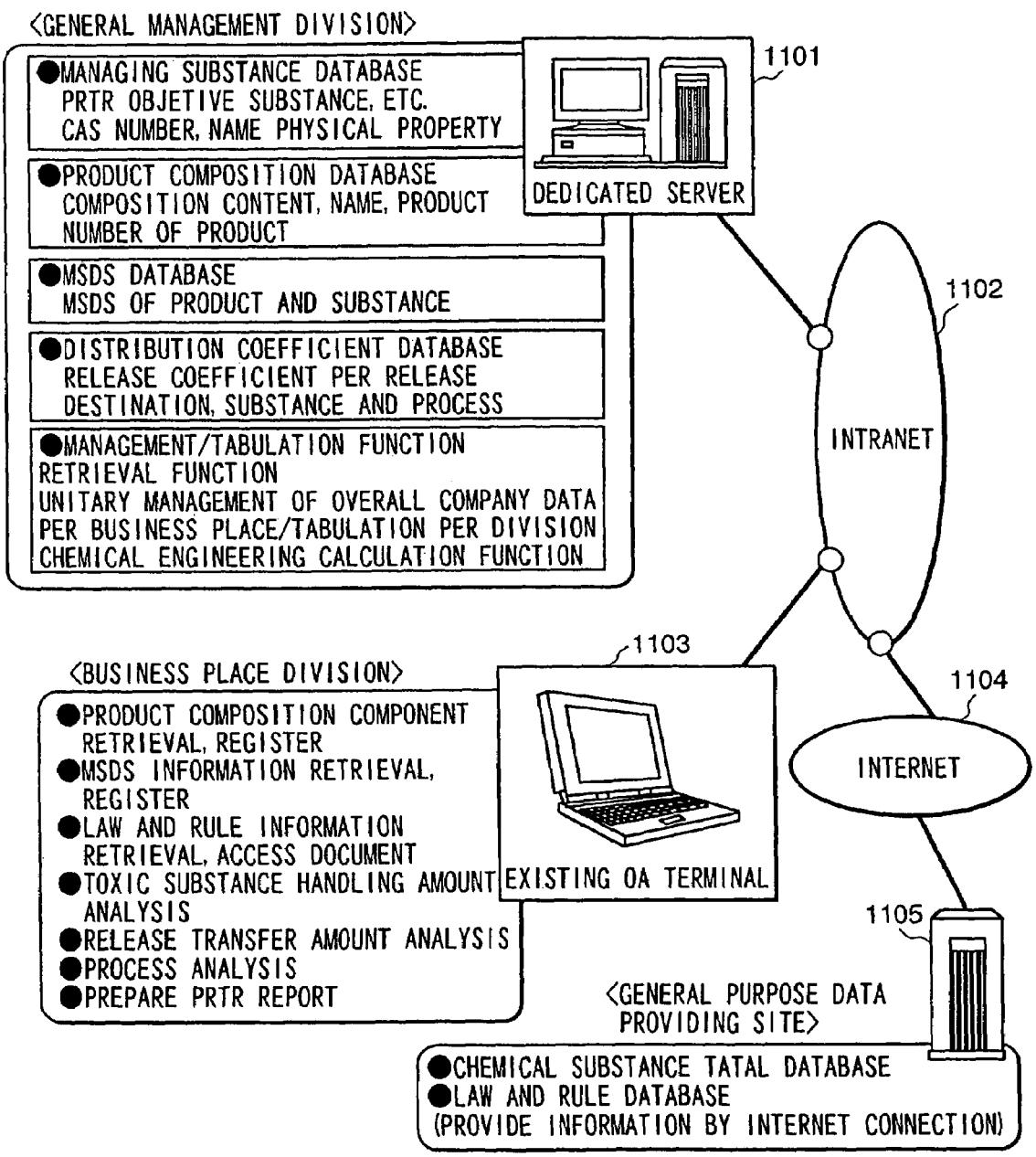
FIG. 11 is a diagrammatic illustration showing a system construction of one embodiment of the chemical substance total management system according to the present invention.

FIG. 11 shows an example of a system construction of the shown embodiment of the chemical substance total management system according to the present invention.

A dedicated server computer 1101 is installed in a general managing division to include all database and processing portions shown in FIG. 1. By connecting the dedicated server computer 1101 to a corporate network or intranet 1102, terminal computers 1103 at various factories, business offices and so forth in the corporation are enabled to use all functions. On the other hand, by placing the database shown in FIG. 1 in a general purpose data providing site 1105 outside of the corporation and connecting to the site 1105 through an internet 1104, it becomes possible to effectively use wide range data which cannot be stored in the dedicated server computer, or frequently updated data. It is preferred to distribute the MSDS data, the material composition data, the managing substance data and the releasing coefficient data to the dedicated server computer 1101 via the internet 1104 and the corporate network or the intranet 1102 for updating.

FIG. 12 shows an example of an input screen image of the shown embodiment of the chemical substance total management system according to the present invention.

At first, in the first input screen image 12a, data of the tabulation result record relating to "Abc business office" designated as organization of the tabulation range is output for displaying. While the shown result displays releasing and transferring amount relating to three managing substances of "toluene", "arsenic" and "phenol". When retrieval process is commanded designating "toluene" among three managing substances, for example, the second input screen 12b appears as the result of retrieval and breakdown of value in the line of "toluene" is output to display in connection with the process, In the second input screen image, under the condition "releasing and transferring of toluene in Abc business office", the breakdown is divided per each process of "painting", "washing" and "surface treatment". A total of the values in respective releasing and transfer items matches with the value on the first input screen image. Namely, in the second input screen image 12a, data extracted from the releasing and transferring amount record relating to the designated tabulation result record, is output for displaying.

Furthermore, in the second input screen image 12b, if retrieval process is designated commanding "painting", a third input screen image 12c appears. The breakdown of the value in the line of "paining" is output for displaying in relation to the material. In the third input screen image 12c, under a condition "releasing and transferring of toluene in painting process of Abc business office". The breakdown is made per material of "Alpha paint" and "Beta diluent". Total of the values in respective items of releasing and transferring destination matches with the value on the second input screen image 12b. Namely, in the third input screen image 12c, the extracted data from the substance handling amount record and the material handling amount record relating to the designated releasing and transferring amount record, is output for displaying. Both records are generated by continuously performing the second retrieval process and the third retrieval process among retrieval processes.

Furthermore, in the third input screen image 12c, when the retrieval process is commanded by designating the "Alpha paint", the fourth input screen image 12d appears to display information relating to charge record of "Alpha paint" on an output screen image. There is shown raw information, such as purchase document and stock management document is displayed. Namely, in the fourth input screen image 12d, data extracted from the material management record relating to the designated material handling amount record is output for displaying.

As a breakdown of the tabulation result, the releasing and transferring amount per the releasing and transferring destination of the managing substance in the process and the releasing and transferring amount per the releasing and transferring destination of the managing substance in the material have particularly important meaning. Therefore, breakdown per process, namely, data extracted from the releasing and transferring amount record may be preliminarily displayed to designate one line thereof to designate the retrieval process for displaying output of breakdown per material and namely displaying output of data extracted from the substance handling amount record and the material handling amount record.

With the shown embodiment of the present invention constructed as set forth above the breakdown of the releasing and transferring amount per the releasing and transferring destination of the managing substance, namely, the process, in which the managing substance is handled and the releasing and transferring amount per releasing and transferring destination of the managing substance in the process may be identified, or the material, in which the managing substance is contained and the releasing and transferring amount per releasing and transferring destination of the managing substance in the material may be identified to aid for management and reduction of the managing substance by the business entity.

On the other hand, with the shown embodiment of the present invention, when the process, in which the managing substance is handled and the releasing and transferring amount per releasing and transferring destination of the managing substance in the process may be identified, or, or the material, in which the managing substance is contained and the releasing and transferring amount per releasing and transferring destination of the managing substance in the material may be identified, for retrieving the original record from the result record on the basis of the link information, identification of the process, in which the managing substance is handled and the releasing and transferring amount per releasing and transferring destination of the managing substance in the process, or, or identification of the material, in which the managing substance is contained and the releasing and transferring amount per releasing and transferring destination of the managing substance in the material, can be speeded up. Since retrieval has to be performed against huge amount of records, if retrieval is performed by keyword or the like, significant period is required, and difficulty is caused in obtaining breakdown of the releasing and transferring amount per releasing and transferring designation of the managing substance.

Also, in the shown embodiment of the present invention, since link information is generated upon generation of the result record, preparation of identification of the process, in which the managing substance is handled and the releasing and transferring amount per releasing and transferring destination of the managing substance in the process, or identification of the material, in which the managing substance is contained and the releasing and transferring amount per releasing and transferring destination of the managing substance in the material, namely preparation of the link information is not necessary to be performed by the business entity. Particularly, the present invention can dynamically adapted to variation of the material to be handled by the business entity or variation of the managing substance required for management by the business entity by automatically preparing the link information.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A chemical substance total management system for managing chemical substances contained in materials handled by a business entity, the system including:

input means for receiving input records, each of which identifies a material to be handled by the business entity and provides information relating to the purchase of the material, including the mass of material purchased;

a set of databases storing information about the materials to be handled by the business entity, including:

in which process or processes each material is used;

which chemical substances to be managed are contained in each material; and a release/transfer coefficient of each chemical substance to be managed to each release/transfer destination for each material handled by the business entity for each process;

a handling processing portion arranged to generate one or more handling records from an input record or records on the basis of information contained in the set of databases, wherein the handling records each identify:

a process in which a material identified in the input records is to be used and the amount of a chemical substance to be managed which is contained in the identified material that is to be handled in the identified process, and include handling link information which correlates each handling record with the input record or records used to generate it;

an evaluation tabulation processing portion arranged to generate one or more process release/transfer records from the handling records on the basis of information contained in the set of databases, each process release/transfer record being based on information contained in a set of respective handling records, each of which identify the same process and chemical substance to be managed, each process release/transfer record respectively identifying the process and chemical substance to be managed identified in the respective handling records and a process release/transfer amount of that chemical substance for each release/transfer destination, and including evaluation link information which correlates the process release/transfer record with its respective handling records;

a total tabulation processing portion arranged to generate one or more total release/transfer records from the process release/transfer records, each total release/transfer record being based on information contained in a set of respective process release/transfer records, each of which identify the same chemical substance to be managed, each total release/transfer record respectively identifying the chemical substance to be managed identified in the respective process release/transfer record(s) and a total release/transfer amount of that chemical substance for each release/transfer destination, and including total link information which correlates the total release/transfer record with its respective process release/transfer records;

a result database for storing the input records, the handling records, the process release/transfer records and the total release/transfer records;

a retrieval processing portion arranged to retrieve process release/transfer records, handling records, or input records from the result database on the basis of the total link information, evaluation link information or handling link information respectively; and a display portion arranged to display records stored in the result database 110.

2. A system according to claim 1, wherein the handling process portion includes:

an input processing portion arranged to generate one or more material handling records from an input record or input records relating to a given material on the basis of information contained in the set of databases, each material handling record is to be used and the amount of that material used in the process, and including material handling link information which correlates the material handling record with its respective input records;

a process tabulation processing portion arranged to generate one or more substance handling records from each material handling record on the basis of information contained in the set of databases, each substance handling record respectively identifying a chemical substance to be managed which is contained in the material identified in the material handling record, the process identified in the material handling record and the amount of the chemical substance that is handled in that process, and including substance handling link information which correlates the substance handling record; with its respective material handling record;

and wherein the evaluation tabulation processing portion is arranged to generate the process release/transfer records from the substance handling record, and the evaluation link information correlates each of the process release/transfer records with its respective substance handling record.

3. A method of managing chemical substances contained in materials handled by a business entity, the method including:

inputting an input record which identifies a material to be handled by the business entity and provides information relating to the purchase of the material, including the mass of material purchased;

storing information about the materials to be handled by the business entity, including:
  in which process or processes each material is used;
  which chemical substances to be managed are contained in each material, and
  a release/transfer coefficient of each chemical substance to be managed to each release/transfer destination for each material handled by the business entity for each process;

generating one or more material handling records from an input record or records relating to a given material on the basis of the stored information, each material handling record respectively identifying a process in which the material is to be used and the amount of that material used in that process;

providing a material handling link correlating each material handling record with its respective input records;

generating one or more substance handling records from each material handling record on the basis of the stored information, each substance handling record respectively identified a chemical substance to be managed which is contained in the material identified in the material handling record, the process identified in the material handling record and the amount of the chemical substance that is handled in that process;

providing a substance handling link correlating each substance handling record with its respective material handling record;

generating one or more process release/transfer records from the substance handling records on the basis of the stored information by:
  identifying a set of respective substance handling records which identify the same process and chemical substance to be managed; and
  evaluating a process release/transfer amount of that chemical substance for each release/transfer destination, each process release/transfer record respectively identifying the process and chemical substance to be managed that are identified in the respective substance handling records and the evaluated process release/transfer amounts for each destination;

providing an evaluation link correlating each process release/transfer record with its respective substance handling records;

generating one or more total release/transfer records from the process release/transfer records by:
  identifying a set of respective process release/transfer records which identify the same chemical substance to be managed; and
  evaluating a total release/transfer amount of that chemical substance for each release/transfer destination, each total release/transfer record respectively identifying the chemical substance to be managed identified in the respective process release/transfer records and the evaluated total release/transfer amount for each destination;

providing a total link correlating each total release/transfer record with its respective process release/transfer records;

storing the input records, the material handling records, the substance handling records, the process release/transfer records and the total release/transfer records;

displaying one or more of the stored records according to input criteria of an operator; and accessing correlated records by activating the link provided with the displayed records.

* * * * *

UNITED STATES PATENT AND TRADEMARK OFFICE
CERTIFICATE OF CORRECTION

PATENT NO. : 7,272,465 B2  Page 1 of 1
APPLICATION NO. : 11/230511
DATED : September 18, 2007
INVENTOR(S) : Yoshiaki Ichikawa et al.

It is certified that error appears in the above-identified patent and that said Letters Patent is hereby corrected as shown below:

| Column | Line | |
|---|---|---|
| 14 | 5 | Change "ryerased" to --erased--. |
| 14 | 52 | Change "line of "paining" is" to --line of "painting" is--. |
| 17 | 18 | After "result database" delete "110". |

Signed and Sealed this

Third Day of March, 2009

JOHN DOLL
*Acting Director of the United States Patent and Trademark Office*